US006829822B1

(12) United States Patent
Minick

(10) Patent No.: US 6,829,822 B1
(45) Date of Patent: Dec. 14, 2004

(54) PALLET BOARD REMOVAL ASSEMBLY

(76) Inventor: Juston E. Minick, 6910 Fourche Dam Pike, Little Rock, AK (US) 72206

( * ) Notice: Subject to any disclaimer, the term of this patent is extended or adjusted under 35 U.S.C. 154(b) by 0 days.

(21) Appl. No.: 10/609,459

(22) Filed: Jun. 27, 2003

(51) Int. Cl.⁷ ................................................ B23P 21/00
(52) U.S. Cl. ........................ 29/772; 29/426.3; 29/239; 29/402.03; 29/784
(58) Field of Search ........................ 29/772, 784, 799, 29/239, 402.01, 402.03, 426.1, 426.3, 426.4, 897.3

(56) References Cited

U.S. PATENT DOCUMENTS

| 3,512,242 A | 5/1970 | Harvis |
| 3,846,890 A | 11/1974 | Bielkiewicz |
| 3,899,816 A | * 8/1975 | Jennings ...................... 29/239 |
| 3,916,498 A | * 11/1975 | Lopez ........................ 29/239 |
| 3,988,822 A | 11/1976 | Lopez et al. |
| 4,051,588 A | 10/1977 | Conkle |
| 4,089,098 A | 5/1978 | DeMarco |
| 4,112,578 A | * 9/1978 | Sanford ....................... 29/700 |
| 4,285,110 A | 8/1981 | Fagre, Jr. |
| 4,845,825 A | 7/1989 | Gleason |
| 5,205,197 A | 4/1993 | Wiltshire |
| 5,375,315 A | 12/1994 | Griffith et al. |
| 5,457,869 A | 10/1995 | Doyle |
| 5,463,808 A | 11/1995 | Harris |
| 5,467,516 A | 11/1995 | DeGeorge |
| 5,848,459 A | 12/1998 | Minick |
| 6,154,955 A | 12/2000 | Beane |

* cited by examiner

Primary Examiner—David P. Bryant
Assistant Examiner—Stephen Kenny

(57) ABSTRACT

A pallet board removal assembly for providing mechanical assistance to remove any board of a pallet for replacement includes a frame having rollers forming a bed. A pair of jaws are pivoted with staggered distal ends to clamp and subsequently remove a selected board from a pallet. The invention further includes a board cushioning assembly to control movement of the removed board and an optional nail press assembly to drive nail stubble into the stringers of the pallet.

16 Claims, 6 Drawing Sheets

PALLET BOARD REMOVAL ASSEMBLY

BACKGROUND OF THE INVENTION

1. Field of the Invention

The present invention relates to pallet repair tools and more particularly pertains to a new pallet board removal assembly for providing mechanical assistance to remove any board of a pallet for replacement.

2. Description of the Prior Art

The use of pallet slat removal tools is known in the prior art. U.S. Pat. No. 6,154,955 issued to Beane describes a device that uses a pivoting paddle coupled to a frame member inserted into a pallet. Another type of pallet slat removal tool is U.S. Pat. No. 5,463,808 issued to Harris having a pusher bar for moving a pallet along a bed. U.S. Pat. No. 5,467,516 issued to DeGeorge provides several power-operated arms for removing end slats on a pallet. U.S. Pat. No. 5,848,459 issued to the present inventor discloses another machine to remove the end board of a pallet. U.S. Pat. No. 5,457,869 issued to Doyle discloses an end slat remover that addresses the problem of nail stubble after the end slat is removed. Additional patents relating to disassembly of pallets, nail stubble removal, and pallet repair include U.S. Pat. No. 4,051,588 issued to Conkle, U.S. Pat. No. 5,375,315 issued to Griffith et al., U.S. Pat. No. 3,988,822 issued to Lopez et al., U.S. Pat. No. 4,845,825 issued to Gleason, U.S. Pat. No. 4,089,098 issued to DeMarco, U.S. Pat. No. 4,285,110 issued to Fagre, Jr., U.S. Pat. No. 3,846,890 issued to Bielkiewicz, U.S. Pat. No. 5,205,197 issued to Wiltshire, and U.S. Pat. No. 3,512,242 issued to Harvis.

While these devices fulfill their respective, particular objectives and requirements, the need remains for a machine that effectively and efficiently permits removal of any selectable pallet slat without having to remove undamaged slats, effectively and quickly gets nail stubble out of the way of a repair slat, and permits use by a single person to maximize efficiency of a workforce to repair many pallets.

SUMMARY OF THE INVENTION

The present invention meets the needs presented above by providing a mechanism for removing any one of the slats of a pallet, providing a safe and effective press for pushing nail stubble into the pallet stringers to permit attachment of a new slat, and by providing a work surface that is designed to permit safe and easy handling by a single worker to maximize worker production.

To this end, the present invention generally comprises a frame having rollers forming a bed. A pair of jaws are pivoted with staggered distal ends to clamp and subsequently remove a selected board from a pallet. The invention further includes a board cushioning assembly to control movement of the removed board and an optional nail press assembly to drive nail stubble into the stringers of the pallet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
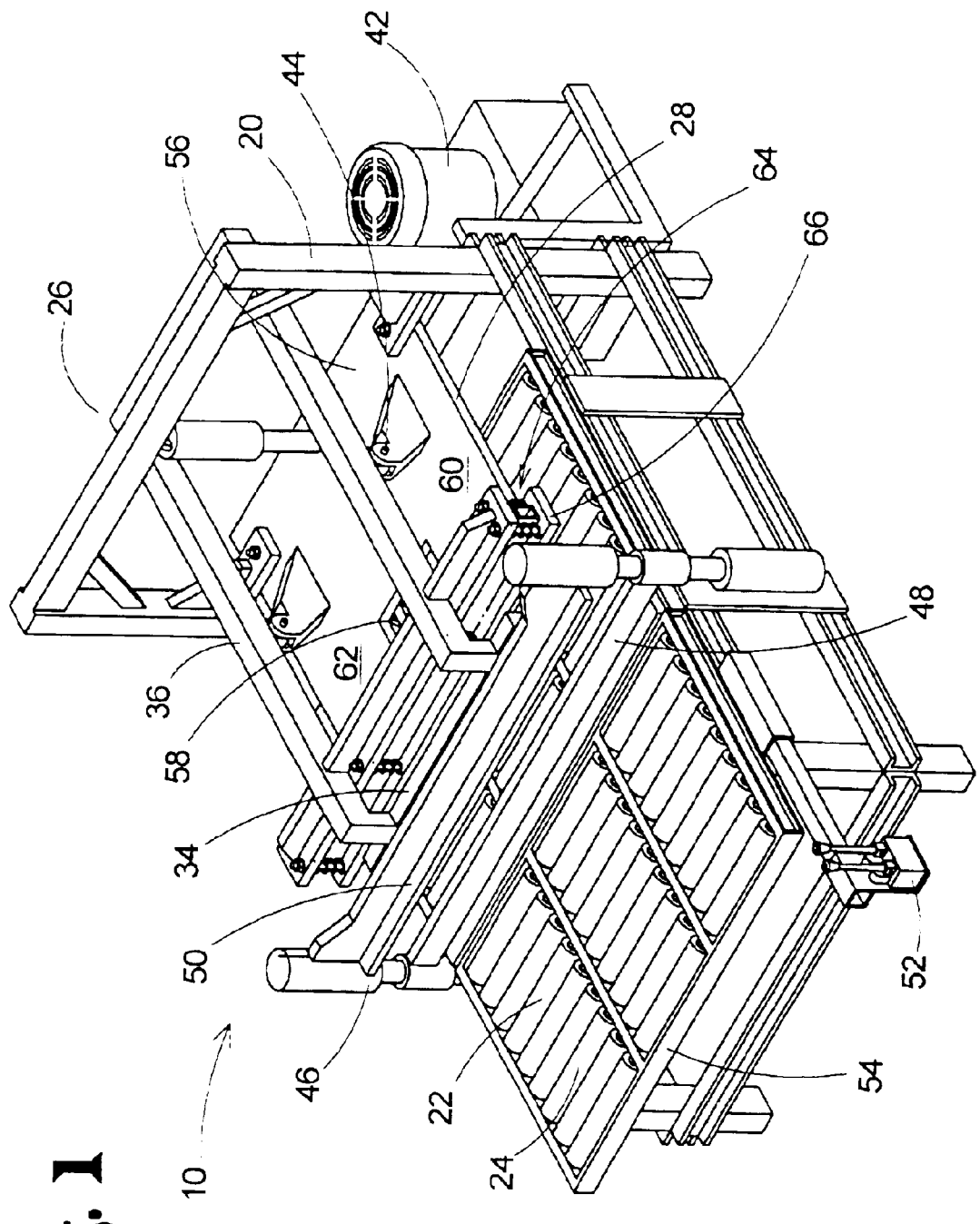
FIG. 1 is a perspective view of a new pallet board removal assembly according to the present invention.
Figure 2:
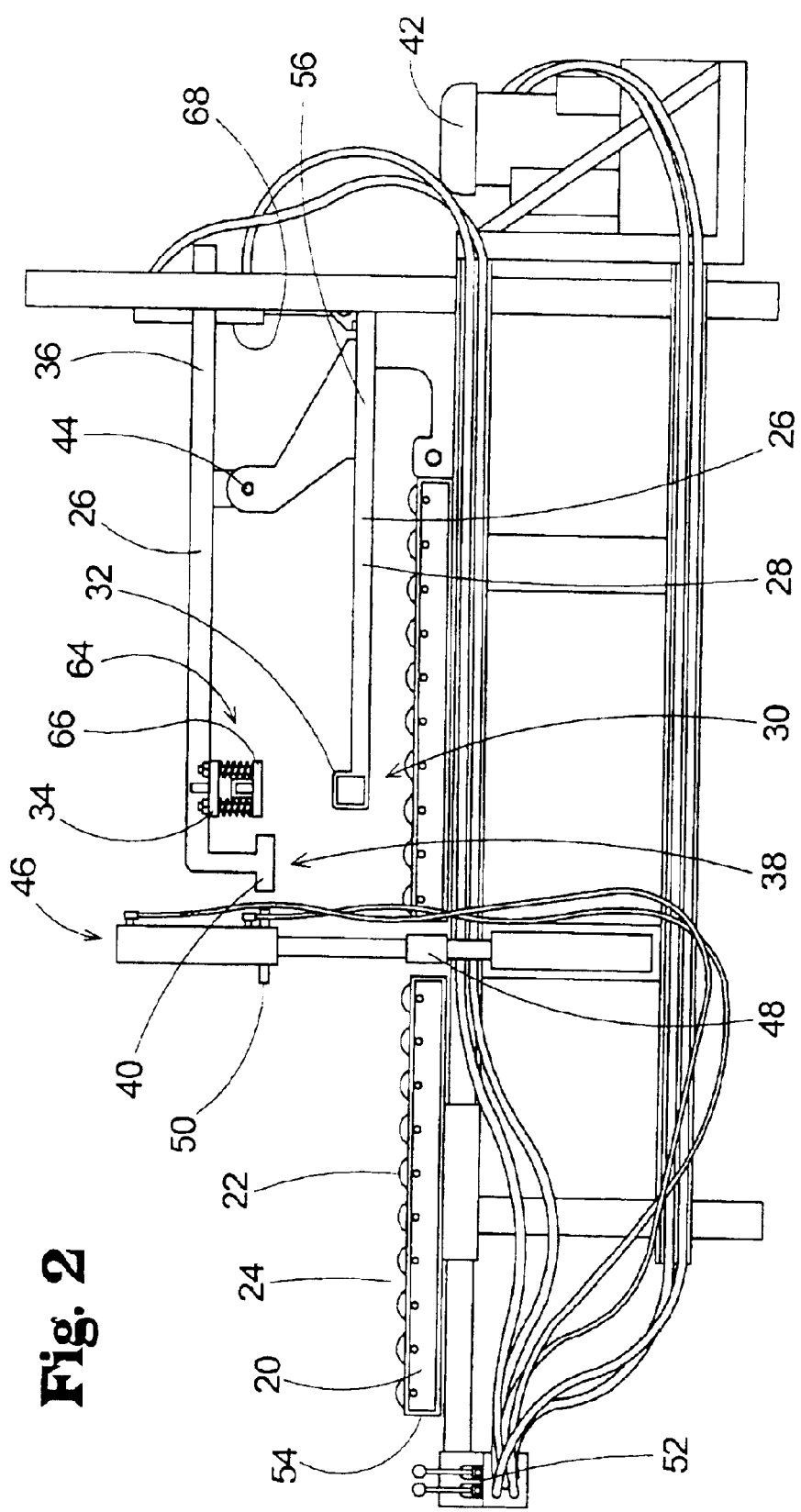
FIG. 2 is a side view of the present invention.
Figure 3:
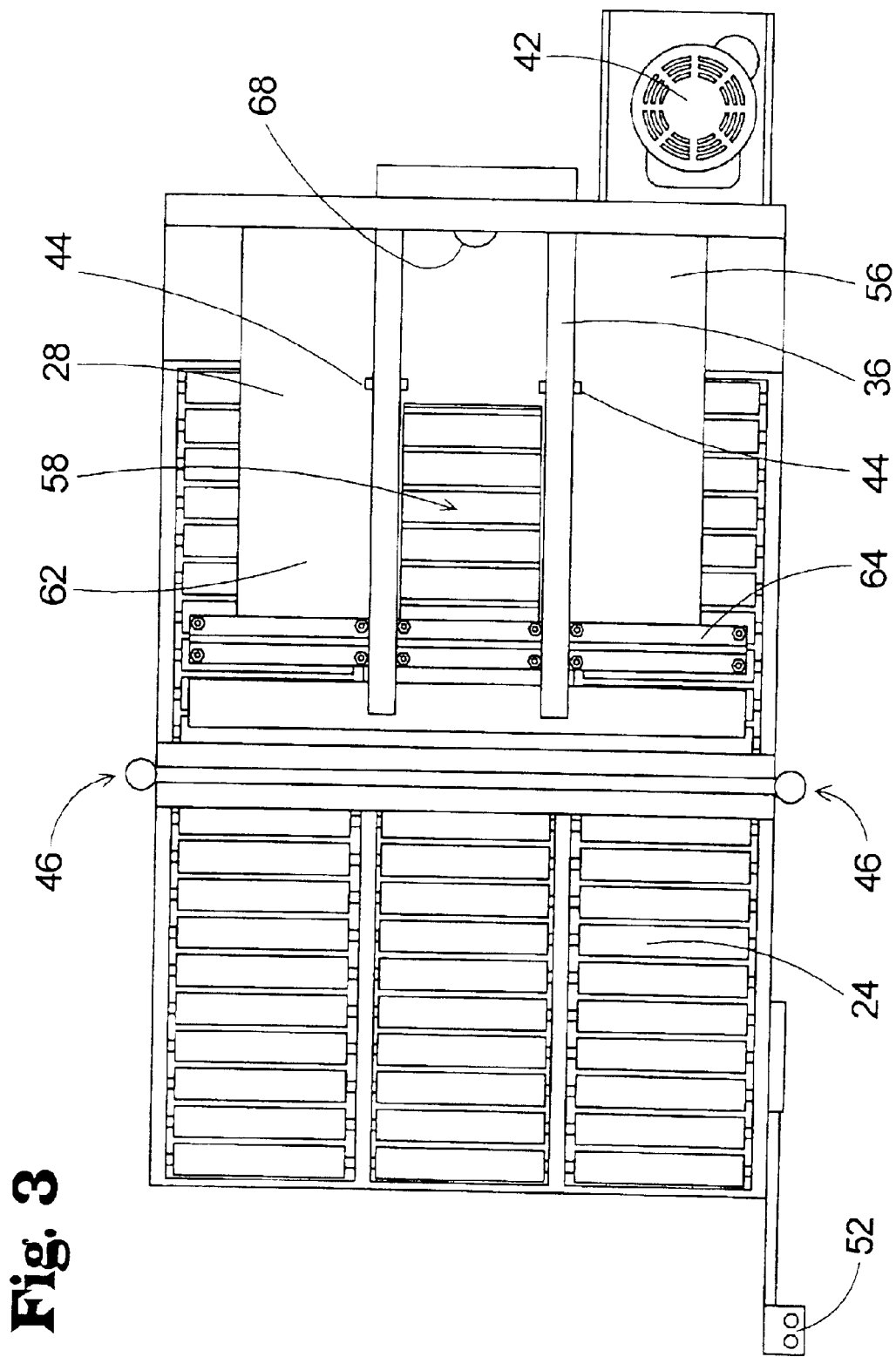
FIG. 3 is a top view of the present invention.
Figure 4:
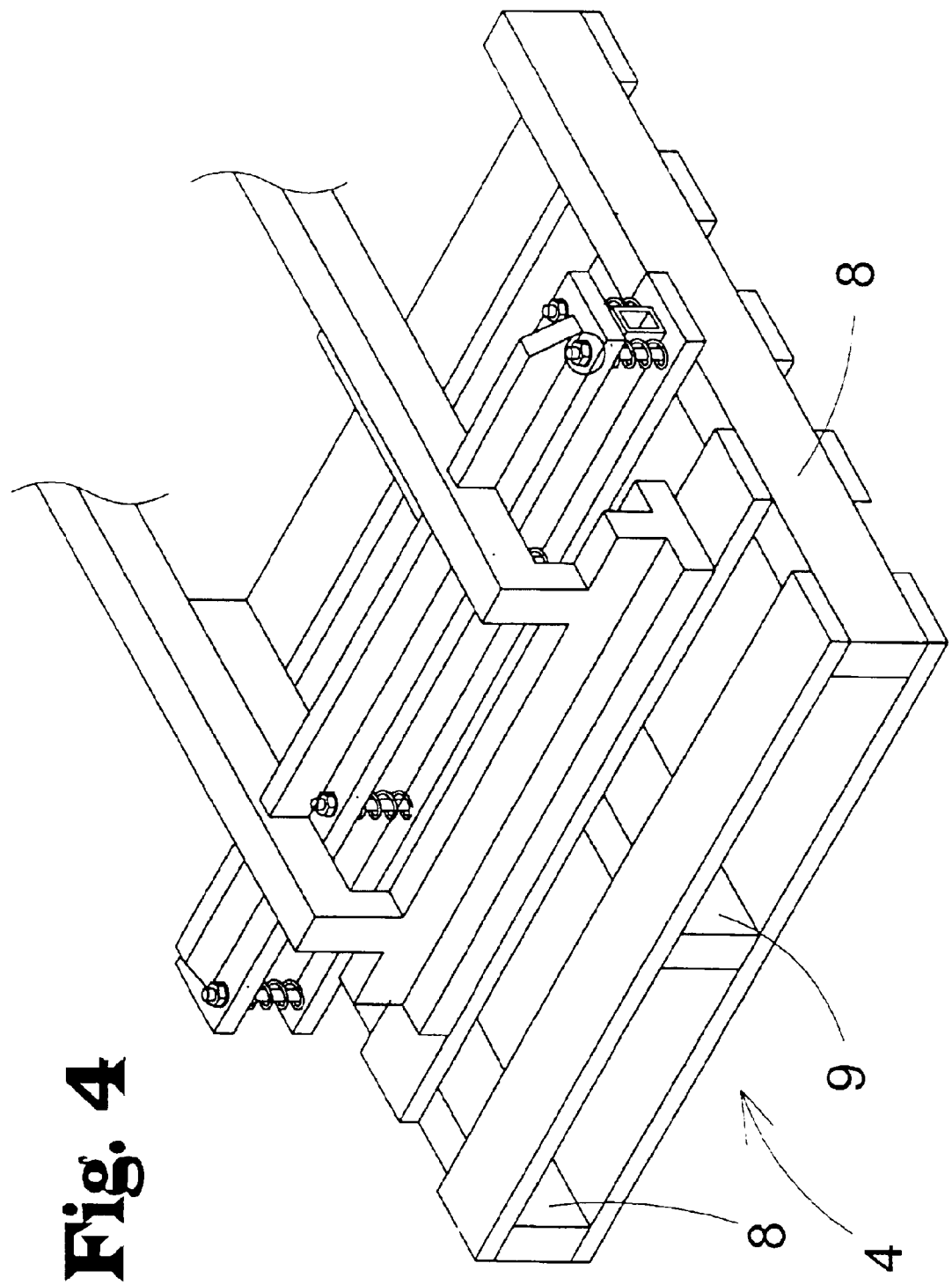
FIG. 4 is a perspective view of the upper jaw assembly of the present invention.
Figure 5:
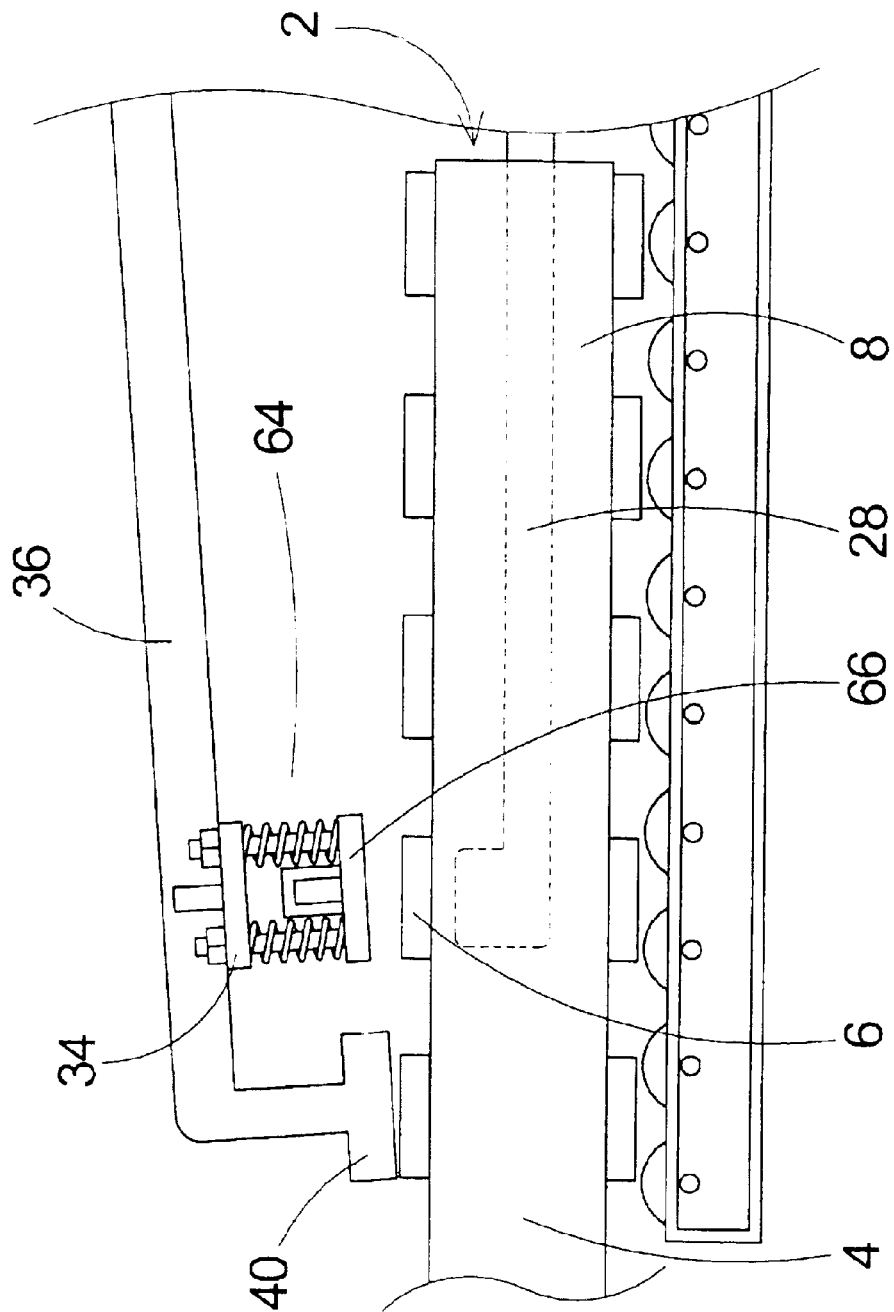
FIG. 5 is a side view of the jaws of the present invention in use.
Figure 6:
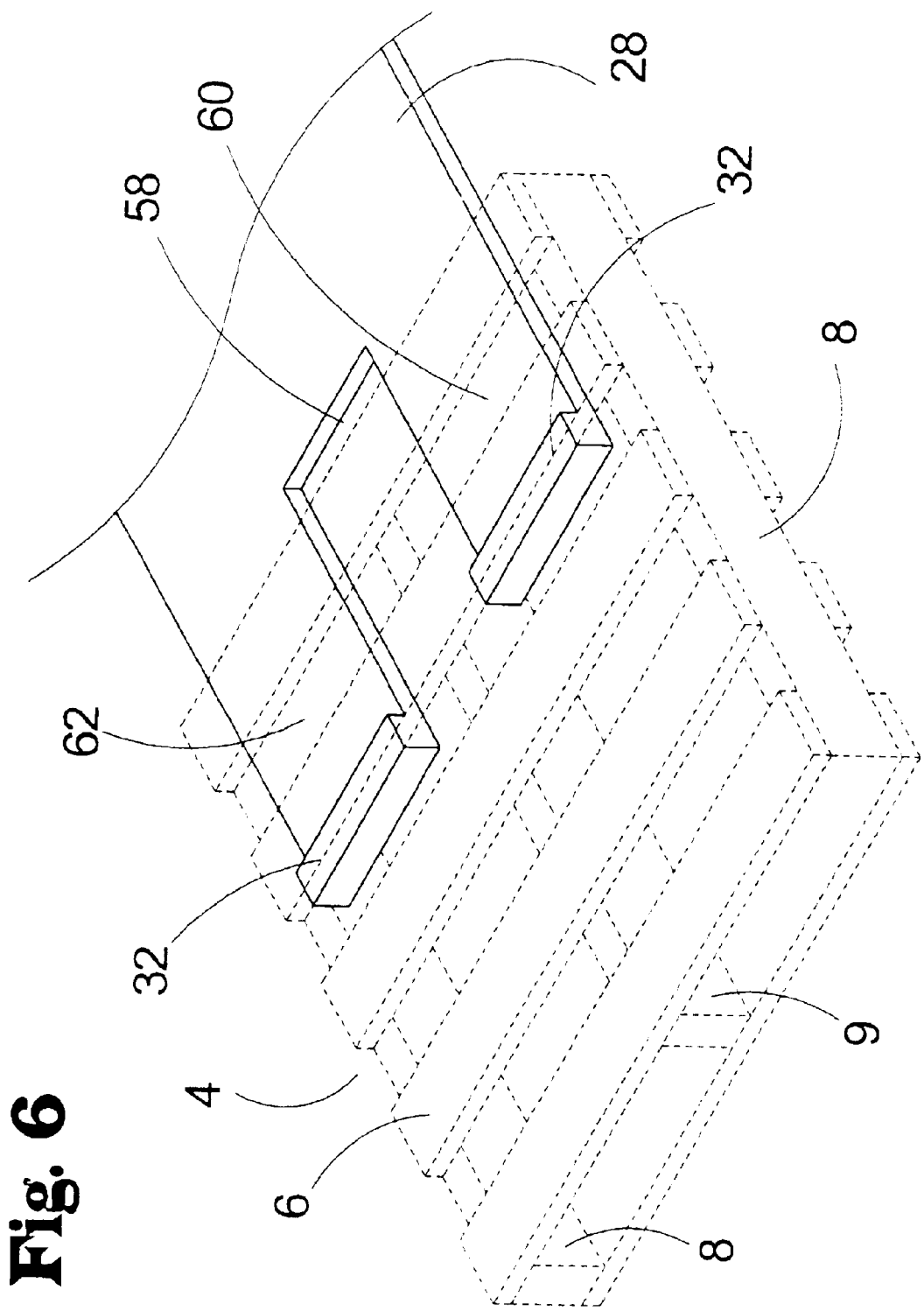
FIG. 6 is a perspective view of the lower jaw assembly of the present invention.

With reference now to the drawings, and in particular to FIGS. 1 through 6 thereof, a new pallet board removal assembly embodying the principles and concepts of the present invention and generally designated by the reference numeral 10 will be described.

As best illustrated in FIGS. 1 through 6, the pallet board removal assembly 10 generally comprises a frame 20 that includes rollers 22 forming a bed 24. A pair of jaws 26 extend from the frame 20 such that the jaws 26 are suspended above the bed 24. A lower jaw 28 of the pair of jaws 26 is insertable into an end 2 of a pallet 4 such that a distal end portion 30 of the lower jaw 28 is alignable with a selectable board 6 of the pallet 4. The distal end portion 30 of the lower jaw 28 forms a board removal portion 32 of the lower jaw 28. A distal end 34 of an upper jaw 36 of the pair of jaws 26 forming a clamping portion 38 positioned at an end 40 of the upper jaw 36. The jaws are of sufficient length to be insertable into the pallet 4 to engage any selected board of the pallet 4.

The clamping portion 38 is positioned staggered from the board removal portion 32 of the lower jaw 28. Thus, the upper jaw 36 clamps the pallet against the bed 24 and the lower jaw 28 engages and removes a board 6 from the pallet 4 upon closing of the pair of jaws 26. Actuating means 42 are coupled to the jaws 26 for moving the jaws 26 about a pivot point 44 to close the jaws 26. The actuating means is preferably a hydraulic system utilizing a hydraulic ram 68. The necessary hydraulic equipment may be positioned at an end of the frame opposite where the user would typically stand. The hydraulic equipment, or other parts forming the actuating means, may be positioned on a support bracket coupled to the frame such that the invention may be moved as a unit for convenience.

A control mechanism 52 is provided. The control mechanism 52 is most preferably positioned adjacent to an end 54 of the bed 24 opposite the jaws 26 for facilitating use of the jaws 26 by a user standing at the end 54 of the bed 24 opposite the jaws 26. Thus, the user may load and align pallets for board removal from the same position used to control the invention resulting in greater efficiency. This also positions the user sufficiently distant from the jaws to prevent undue risk. Further, the controls are sufficiently distant from the jaws that accidental operation of the jaws is virtually impossible when the user moves to a position immediately adjacent to the jaws.

The rollers 22 are oriented to move the pallet 4 along a longitudinal axis of the bed 24 to facilitate positioning of the pallet 4 by the user.

Typically, the pallets are of a standardized size having outer stringers and a central stringer board 9 supporting a medial portion of each of the boards of the pallet. The lower jaw 28 includes a plate 56 that has a slot 58 for receiving the central stringer board 9 of the pallet 4. The slot 58 defines a pair of segments 60,62 for engaging the board 6 being removed on each side of the central stringer board 9. Each of the segments 60,62 has a length less than a distance between adjacently positioned stringer boards of the pallet 4 to facilitate insertion of the segments 60,62 into the pallet 4. Preferably, each of the segments 60,62 has a length greater than about 90% of the distance between the adjacently positioned stringer boards of the pallet 4 to more evenly distribute the jaw force on the board 6 to prevent additional breakage or damage to the board 6 as it is removed.

In an embodiment, the upper jaw 36 has a length from the pivot point 44 greater than that of the lower jaw 28. A board cushioning assembly 64 is coupled to the upper jaw 36 such that the board cushioning assembly 64 is aligned with the board removal portion 32 of the lower jaw 28. The board cushioning assembly 64 includes a biased panel 66 positioned such that a board 6 being removed from the pallet 4 is urged into the biased panel 66 compressing the board cushioning assembly 64 to stabilize the board 6 during removal. This prevents the board 6 from popping off the pallet violently, splintering in a dangerous fashion, and generally restricts the board from becoming a hazard during removal.

Optionally, a nail press assembly 46 is coupled to the frame 20. The nail press assembly 46 is designed for driving nail stubble into stringers 8 of the pallet 4. The nail press assembly 46 includes bottom bar 48 and an upper panel 50 aligned with each other. The bottom bar 48 and the upper panel 50 are movable to clamp the pallet 4 between the bottom bar 48 and the upper panel 50 such that the upper panel 50 drives any nail stubble into the stringers 8 of the pallet 4. The bottom bar 48 is recessed into the bed 24 and is movable upwardly from the recessed position to engage a bottom of the pallet 4. Thus, movement of the pallet 4 along the bed 24 is restricted during driving of the nail stubble into the stringers. The top panel 50 is movable downwardly towards the bottom bar substantially simultaneously with the movement of the bottom bar 48 such that the top panel 50 engages a top of the pallet 4 just after the bottom bar has engaged the bottom of the pallet 4. Thus, the pallet 4 remains substantially on the bed 24 but is prevented from moving on the rollers. The bottom bar 48 and the top panel 50 are preferably spaced to provide sufficiently clearance for a standard sized pallet and nail stubble, but sufficiently close to facilitate easy alignment of the pallet 4. The top panel 50 is also sized to cover an area at least as large as the area of the removed board to permit pressing all potential nail stubble in one action.

The entirety of the device is approximately 101 inches in length, 56 inches tall, and 57 inches wide.

In use, a pallet having a damaged or weak board is positioned on the bed and rolled into place such that the board removal portion of the lower jaw is aligned with the damaged or weak board. Quick manipulation of the controls causes the upper jaw to engage the pallet and the lower jaw to provide a relatively quick and powerful upward force on a substantial area of the damaged or weak board to lift the damaged or weak board away from the stringers of the pallet. The board cushioning assembly is automatically positioned atop the damaged or weak board as the upward force is applied and prevents uncontrolled movement of the removed board. The pallet is then moved along the bed to align the area of the removed board with the top panel of the nail pressing assembly. Quick manipulation of the controls causes the lower bar to engage and hold the pallet as the top panel provides a downward force onto any nail stubble from the removed board forcing the nail stubble into the stringers. The process may be repeated if additional boards are to be replaced. Once all undesired boards have been removed, the pallet is removed from the bed and may be refurbished by attachment of new boards to replace those that were removed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pallet board removing assembly comprising:

a frame having rollers forming a bed;

a pair of jaws extending from said frame such that said jaws are suspended above said bed, a lower jaw of said pair of jaws being insertable into an end of a pallet such that a distal end portion of said lower jaw is alienable with a selectable board of the pallet;

said distal end portion of said lower jaw forming a board removal portion of said lower jaw;

a distal end of an upper jaw of said pair of jaws forming a clamping portion positioned at an end of said upper jaw, said clamping portion being positioned staggered from said board removal portion of said lower jaw whereby said upper jaw clamps the pallet against the bed and said lower jaw engages and removes a board from the pallet upon closing of said pair of jaws; and actuating means coupled to said jaws for moving said jaws about a pivot point to close said jaws.

2. The pallet board removing assembly of claim 1, further comprising:

a nail press assembly coupled to said frame, said nail press assembly being adapted for driving nail stubble into stringers of the pallet.

3. The pallet board removing assembly of claim 2, further comprising:

said nail press assembly having bottom bar and an upper panel aligned with each other; and said bottom bar and said upper panel being movable to clamp the pallet between said bottom bar and said upper panel such that said upper panel is adapted to drive nail stubble into the stringers of the pallet.

4. The pallet board removing assembly of claim 1 wherein said actuating means is hydraulic.

5. The pallet board removing assembly of claim 4, further comprising:

a control mechanism, said control mechanism being positioned adjacent to an end of said bed opposite said jaws for facilitating use of said jaws by a user standing at said end of said bed opposite said jaws.

6. The pallet board removing assembly of claim 1 wherein said rollers are oriented to move the pallet along a longitudinal axis of said bed.

7. The pallet board removing assembly of claim 1, further comprising:

said lower jaw including a plate having a slot for receiving a central stringer board of the pallet, said slot defining a pair of segments for engaging the board being removed on each side of a central stringer board.

8. The pallet board removing assembly of claim 7, further comprising:

each of said segments having a length less than a distance between adjacently positioned stringer boards of the pallet.

9. The pallet board removing assembly of claim 7, further comprising:

each of said segments having a length greater than about 90% of said distance between said adjacently positioned stringer boards of the pallet.

10. The pallet board removing assembly of claim 8, further comprising:

each of said segments having a length greater than about 90% of said distance between said adjacently positioned stringer boards of the pallet.

11. The pallet board removing assembly of claim 1, further comprising:

said upper jaw having a length greater than said lower jaw.

12. The pallet board removing assembly of claim 11, further comprising:

a board cushioning assembly coupled to said upper jaw such that said board cushioning assembly is aligned with said board removal portion of said lower jaw.

13. The pallet board removing assembly of claim 12, further comprising:

said board cushioning assembly having a biased panel positioned such that a board being removed from the pallet is urged into said biased panel compressing said board cushioning assembly to stabilize the board being removed during removal.

14. The pallet board removing assembly of claim 3, further comprising:

said bottom bar being recessed into said bed, said bottom bar being movable upwardly from said recessed position to engage a bottom of the pallet whereby movement of the pallet along said bed is restricted.

15. The pallet board removing assembly of claim 14, further comprising:

said top panel being movable downwardly towards said bottom bar such that said top panel engages a top of said pallet after said bottom bar has engaged a bottom of the pallet.

16. A pallet board removing assembly comprising:

a frame having rollers forming a bed;

a pair of jaws extending from said frame such that said jaws are suspended above said bed, a lower jaw of said pair of jaws being insertable into an end of a pallet such that a distal end portion of said lower jaw is alignable with a selectable board of the pallet;

said distal end portion of said lower jaw forming a board removal portion of said lower jaw;

a distal end of an upper jaw of said pair of jaws forming a clamping portion positioned at an end of said upper jaw, said clamping portion being positioned staggered from said board removal portion of said lower jaw whereby said upper jaw clamps the pallet against the bed and said lower jaw engages and removes a board from the pallet upon closing of said pair of jaws;

actuating means coupled to said jaws for moving said jaws about a pivot point to close said jaws;

a nail press assembly coupled to said frame, said nail press assembly being adapted for driving nail stubble into stringers of the pallet;

said nail press assembly having bottom bar and an upper panel aligned with each other;

said bottom bar and said upper panel being movable to clamp the pallet between said bottom bar and said upper panel such that said upper panel is adapted to drive nail stubble into the stringers of the pallet;

wherein said actuating means is hydraulic;

a control mechanism, said control mechanism being positioned adjacent to an end of said bed opposite said jaws for facilitating use of said jaws by a user standing at said end of said bed opposite said jaws;

wherein said rollers are oriented to move the pallet along a longitudinal axis of said bed;

said lower jaw including a plate having a slot for receiving a central stringer board of the pallet, said slot defining a pair of segments for engaging the board being removed on each side of a central stringer board;

each of said segments having a length less than a distance between adjacently positioned stringer boards of the pallet;

each of said segments having a length greater than about 90% of said distance between said adjacently positioned stringer boards of the pallet;

said upper jaw having a length greater than said lower jaw;

a board cushioning assembly coupled to said upper jaw such that said board cushioning assembly is aligned with said board removal portion of said lower jaw;

said board cushioning assembly having a biased panel positioned such that a board being removed from the pallet is urged into said biased panel compressing said board cushioning assembly to stabilize the board being removed during removal;

said bottom bar being recessed into said bed, said bottom bar being movable upwardly from said recessed position to engage a bottom of the pallet whereby movement of the pallet along said bed is restricted; and said top panel being movable downwardly towards said bottom bar such that said top panel engages a top of said pallet after said bottom bar has engaged a bottom of the pallet.

* * * * *